United States Patent
Ikemoto (10) Patent No.: US 11,473,953 B2
(45) Date of Patent: Oct. 18, 2022

(54) SENSOR DEVICE WITH SENSOR CONNECTOR FOR ACCOMMODATING A CLIP

(71) Applicant: DENSO CORPORATION, Kariya (JP)

(72) Inventor: Tadashi Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 16/922,318

(22) Filed: Jul. 7, 2020

(65) Prior Publication Data

US 2021/0010842 A1    Jan. 14, 2021

(30) Foreign Application Priority Data

Jul. 12, 2019   (JP) .............................. JP2019-130534

(51) Int. Cl.
    G01F 1/76   (2006.01)
(52) U.S. Cl.
    CPC ....................................... G01F 1/76 (2013.01)
(58) Field of Classification Search
    CPC ................ G01F 1/76; G01F 1/68; G01K 1/14
    See application file for complete search history.

(56) References Cited

U.S. PATENT DOCUMENTS

2006/0215731 A1*   9/2006   Gadonniex .............. G01K 1/16
                                                              374/185
2012/0248763 A1*  10/2012   Nakamura ............ F16L 41/008
                                                              285/305

FOREIGN PATENT DOCUMENTS

JP         2004-177223        6/2004

* cited by examiner

Primary Examiner — Eric S. McCall
Assistant Examiner — Timothy P Graves
(74) Attorney, Agent, or Firm — Nixon & Vanderhye P.C.

(57) ABSTRACT

A sensor device includes a pipe, a sensor connector, a sensor, a sealing member, a first clip insertion window, a second clip insertion window, a clip, and at least one cutout portion. The pipe defines a fluid passage. The sensor connector defines a sensor insertion hole. The sensor detects a physical quantity of a fluid flowing through the fluid passage and includes a large diameter portion, a small diameter portion, and a step portion. The second clip insertion window is located opposite to the first clip insertion window relative to an axis of the sensor insertion hole. The clip is inserted into the first clip insertion window and the second clip insertion window to fix the sensor in the sensor insertion hole by holding both sides of the small diameter portion.

5 Claims, 12 Drawing Sheets

SENSOR DEVICE WITH SENSOR CONNECTOR FOR ACCOMMODATING A CLIP

CROSS REFERENCE TO RELATED APPLICATION

This application is based on Japanese Patent Application No. 2019-130534 filed on Jul. 12, 2019, the disclosure of which is incorporated herein by reference in its entirety.

TECHNICAL FIELD

The present disclosure relates to a sensor device configured to detect a physical quantity of a fluid.

BACKGROUND

A sensor device includes a sensor and a sensor connector having a cylindrical shape. The sensor connector protrudes from a pipe through which the fluid flows and defines a sensor insertion hole, and the sensor is attached to the sensor insertion hole. An end portion of the sensor connector defining an opening is entirely contact with a part of the sensor exposed from the sensor connector

SUMMARY

A sensor device is configured to detect a physical quantity of a fluid and includes a pipe, a sensor connector, a sensor, a sealing member, a first clip insertion window, a second clip insertion window, a clip, and at least one cutout portion. The pipe defines a fluid passage through which the fluid flows. The sensor connector defines a sensor insertion hole fluidly in communication with the fluid passage. The sensor includes a large diameter portion to be located at a deep position of the sensor insertion hole, a small diameter portion to be located between an opening of the sensor insertion hole and the large diameter portion, and a step portion connecting the large diameter portion and the small diameter portion. The sensor detects the physical quantity of the fluid flowing through the fluid passage. The sealing member has an annular shape and is located at a side of the step portion deeper in the sensor insertion hole. The sealing member seals a space between an inner wall of the sensor insertion hole and the sensor. The first clip insertion window is located at a part of the sensor connector in a circumferential direction and passes through the sensor connector between an outer wall and the inner wall. The second clip insertion window is located at a part of the sensor connector in a circumferential direction and passes through the sensor connector between the outer wall and the inner wall. The second clip insertion window is located opposite to the first clip insertion window relative to an axis of the sensor insertion hole. The clip is inserted into the first clip insertion window and the second clip insertion window to fix the sensor in the sensor insertion hole by holding both sides of the small diameter portion of the sensor. The at least one cutout portion is cut out from either the first clip insertion window or the second clip insertion window toward the opening in an axial direction of the sensor insertion hole.

In another aspect of the present disclosure, a sensor device is configured to detect a physical quantity of a fluid. The sensor device includes a pipe, a sensor connector, a sensor, a sealing member, a first clip insertion window, a second clip insertion window, and a clip. The pipe defines a fluid passage through which the fluid flows. The sensor connector defines a sensor insertion hole fluidly in communication with the fluid passage. The sensor includes a large diameter portion to be located at a deep position of the sensor insertion hole, a small diameter portion to be located between an opening of the sensor insertion hole and the large diameter portion, and a step portion connecting the large diameter portion and the small diameter portion. The sensor detects the physical quantity of the fluid flowing through the fluid passage. The sealing member has an annular shape and is located at a side of the step portion deeper in the sensor insertion hole. The sealing member seals a space between an inner wall of the sensor insertion hole and the sensor. The first clip insertion window is located at a part of the sensor connector in a circumferential direction and passes through the sensor connector between an outer wall and the inner wall. The second clip insertion window is located at a part of the sensor connector in a circumferential direction and passes through the sensor connector between the outer wall and the inner wall. The second clip insertion window is located opposite to the first clip insertion window relative to an axis of the sensor insertion hole. The clip is inserted into the first clip insertion window and the second clip insertion window to fix the sensor in the sensor insertion hole by holding both sides of the small diameter portion of the sensor. A second width of the first clip insertion window, in the axial direction, located at a far side of the first clip insertion window is larger than a first width of the first clip insertion window, in the axial direction, located at an inlet side of the first clip insertion window from which the clip is inserted. A second width of the second clip insertion window, in the axial direction, located at a far side of the second clip insertion window is larger than a first width of the second clip insertion window, in the axial direction, located at an inlet side of the second clip insertion window from which the clip is inserted.

DETAILED DESCRIPTION

To begin with, examples of relevant techniques will be described.

Various sensor devices that detect physical quantities such as a temperature and a pressure of a fluid have been known.

A sensor device includes a sensor and a sensor connector having a cylindrical shape. The sensor connector protrudes from a pipe through which the fluid flows and defines a sensor insertion hole, and the sensor is attached to the sensor insertion hole. The sensor connector includes a clip insertion window that passes through the sensor connector between an outer wall and an inner wall in a radial direction and that extends in a circumferential direction of the sensor connector. In this configuration, the sensor is attached to the sensor connector by inserting the sensor into the sensor insertion hole, inserting a clip into the clip insertion window, and fitting the clip into a recess recessed from an outer surface of the sensor.

The sensor device includes an O-ring at a position of the sensor that is to be inserted into the sensor insertion hole. The O-ring is a sealing member sealing a space between an outer surface of the sensor and the inner wall of the sensor insertion hole to prevent the fluid flowing through the pipe from leaking from the sensor connector.

An end portion of the sensor connector defining an opening is entirely contact with a part of the sensor exposed from the sensor connector, so that it is impossible to recognize whether the O-ring is correctly assembled in a state where the sensor is attached to the sensor connector. If the O-ring is assembled with twisted or the O-ring is not assembled, a malfunction such that the fluid flowing through the pipe leaks from the sensor connector may occur. As a result, a reliability of the sensor device may decrease.

In addition, when the clip is inserted into the clip insertion window with supported by an assembly jig, the clip may be tilted to an axial direction of the sensor insertion hole. In this case, tip ends of the clip may hit the inner wall of the sensor insertion hole. If the sensor is not correctly assembled, degree of a misalignment of an axis of the sensor becomes large, which may cause a malfunction of the sensor and further cause a decrease in the reliability of the sensor device.

It is an object of the present disclosure to provide a sensor device improved in a reliability.

A sensor device is configured to detect a physical quantity of a fluid and includes a pipe, a sensor connector, a sensor, a sealing member, a first clip insertion window, a second clip insertion window, a clip, and at least one cutout portion. The pipe defines a fluid passage through which the fluid flows. The sensor connector defines a sensor insertion hole fluidly in communication with the fluid passage. The sensor includes a large diameter portion to be located at a deep position of the sensor insertion hole, a small diameter portion to be located between an opening of the sensor insertion hole and the large diameter portion, and a step portion connecting the large diameter portion and the small diameter portion. The sensor detects the physical quantity of the fluid flowing through the fluid passage. The sealing member has an annular shape and is located at a side of the step portion deeper in the sensor insertion hole. The sealing member seals a space between an inner wall of the sensor insertion hole and the sensor. The first clip insertion window is located at a part of the sensor connector in a circumferential direction and passes through the sensor connector between an outer wall and the inner wall. The second clip insertion window is located at a part of the sensor connector in a circumferential direction and passes through the sensor connector between the outer wall and the inner wall. The second clip insertion window is located opposite to the first clip insertion window relative to an axis of the sensor insertion hole. The clip is inserted into the first clip insertion window and the second clip insertion window to fix the sensor in the sensor insertion hole by holding both sides of the small diameter portion of the sensor. The at least one cutout portion is cut out from either the first clip insertion window or the second clip insertion window toward the opening in an axial direction of the sensor insertion hole.

Accordingly, a state in which the sealing member is assembled can be recognized through the at least one cutout portion from an outside of the sensor connector. Thus, malfunctions such that the sealing member is twisted or is not assembled can be reduced. The sensor device can restrict the fluid from leaking from the sensor connector and improve a reliability.

In addition, when the clip is inserted into the clip insertion window, the clip can be assembled while watching the clip through the at least one cutout portion from an outside of the sensor connector. Thus, malfunctions such that the ends of the clip hit the inner wall of the sensor insertion hole can be reduced and the clip can be attached correctly. The sensor device can reduce the malfunctions in the assembly of the clip and improve the reliability.

Additionally, the sensor connector includes the at least one cutout portion, so that an amount of resin can be reduced. Thus, the sensor device is lightened and the cost in manufacturing can be reduced.

In another aspect of the present disclosure, a sensor device is configured to detect a physical quantity of a fluid. The sensor device includes a pipe, a sensor connector, a sensor, a sealing member, a first clip insertion window, a second clip insertion window, and a clip. The pipe defines a fluid passage through which the fluid flows. The sensor connector defines a sensor insertion hole fluidly in communication with the fluid passage. The sensor includes a large diameter portion to be located at a deep position of the sensor insertion hole, a small diameter portion to be located between an opening of the sensor insertion hole and the large diameter portion, and a step portion connecting the large diameter portion and the small diameter portion. The sensor detects the physical quantity of the fluid flowing through the fluid passage. The sealing member has an annular shape and is located at a side of the step portion deeper in the sensor insertion hole. The sealing member seals a space between an inner wall of the sensor insertion hole and the sensor. The first clip insertion window is located at a part of the sensor connector in a circumferential direction and passes through the sensor connector between an outer wall and the inner wall. The second clip insertion window is located at a part of the sensor connector in a circumferential direction and passes through the sensor connector between the outer wall and the inner wall. The second clip insertion window is located opposite to the first clip insertion window relative to an axis of the sensor insertion hole. The clip is inserted into the first clip insertion window and the second clip insertion window to fix the sensor in the sensor insertion hole by holding both sides of the small diameter portion of the sensor. A second width of the first clip insertion window, in the axial direction, located at a far side of the first clip insertion window is larger than a first width of the first clip insertion window, in the axial direction, located at an inlet side of the first clip insertion window from which the clip is inserted. A second width of the second clip insertion window, in the axial direction, located at a far side of the second clip insertion window is larger than a first width of the second clip insertion window, in the axial direction, located at an inlet side of the second clip insertion window from which the clip is inserted.

Accordingly, when the clip is inserted into the clip insertion windows with supported by an assembly jig and with tilted to the axial direction of the sensor insertion hole, malfunctions such that the ends of the clip hit the inner wall of the sensor insertion hole can be reduced. Thus, the clip can be assembled accurately. The sensor device can reduce the malfunctions in the assembly of the clip and improve the reliability.

Hereinafter, embodiments of the present disclosure will be described with reference to drawings. The same reference numerals are assigned to the same or equivalent portions among the embodiments and redundant explanations are omitted.

First Embodiment

A first embodiment will be described with reference to drawings.

As shown in FIGS. 1 to 4, a sensor device 1 in the first embodiment detects a physical quantity such as a temperature of a fluid. The sensor device 1 includes a pipe 10, a sensor connector 20, a sensor 30, an O-ring 40 as a sealing member, a first clip insertion window 41, a second clip insertion window 42, a clip 50, and cutout portions 60.

Figure 4:
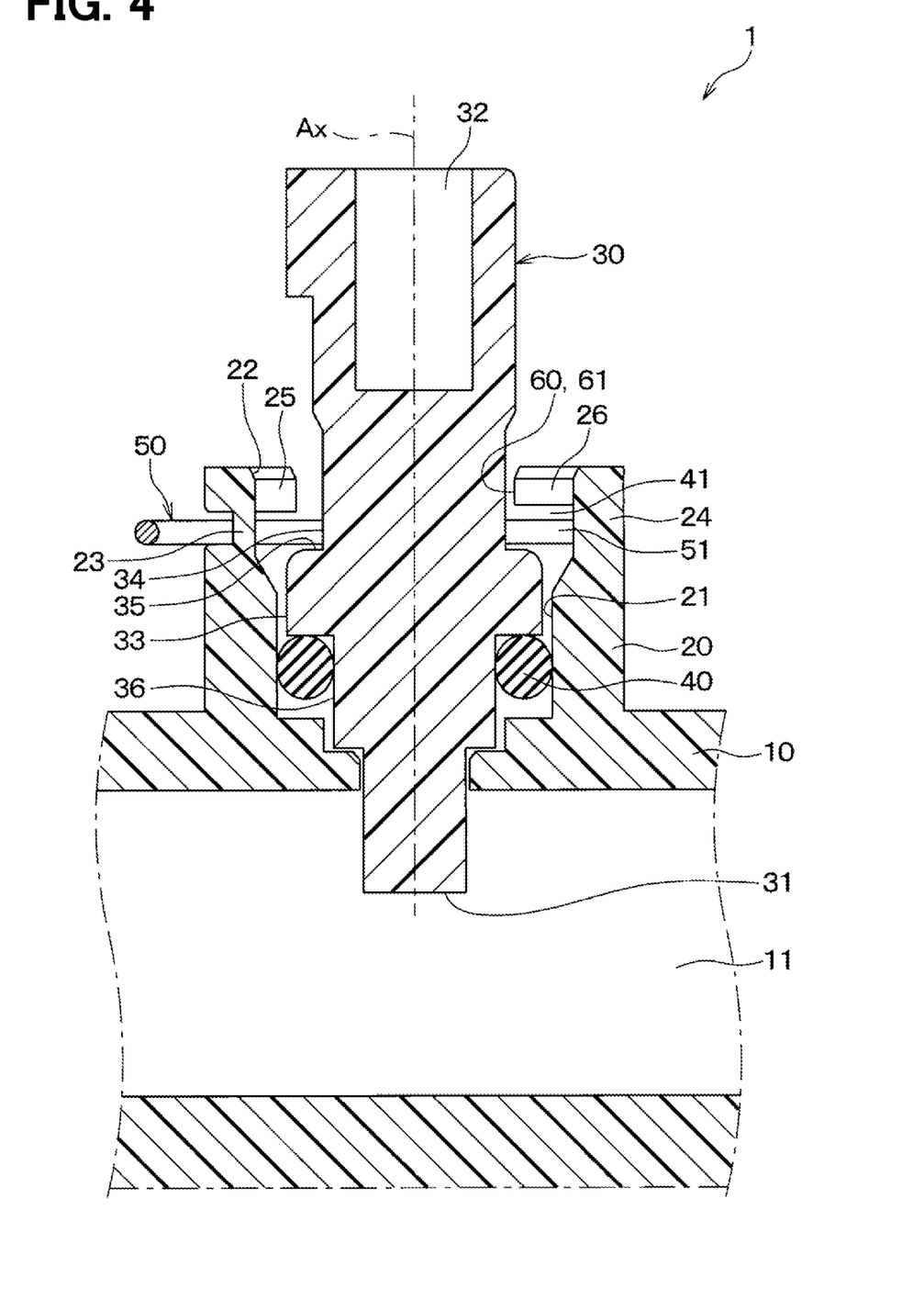
FIG. 4 is a cross-sectional view taken along a line IV-IV of FIG. 3.

As shown in FIG. 4, the pipe 40 defines a fluid passage 11 through which a cooling water as the fluid flows.

The sensor connector 20 has a cylindrical shape and protrudes from an outer surface of the pipe 10. The pipe 10 and the sensor connector 20 are integrally formed with each other. The sensor connector 20 defines a sensor insertion hole 21 therein. The sensor insertion hole 21 is fluidly in communication with the fluid passage 11.

The sensor 30 may be a temperature sensor that detects a temperature of the cooling water. The sensor 30 is inserted into the sensor insertion hole 21. The sensor 30 includes a thermo-sensitive element such as a thermistor at an end 31 facing the fluid passage 11. The other end of the sensor 30 facing away from the fluid passage 11 includes a connector 32. The connector 32 is exposed from an opening 22 of the sensor insertion hole 21. In FIG. 4, illustrations of a wire and the thermo-sensitive element disposed at the sensor 30 are omitted.

The sensor 30 includes a large diameter portion 33, a small diameter portion 34, and a step portion 35 at a position to be located in the sensor insertion hole 21. The large diameter portion 33 is located at a deep position toward the fluid passage 11 in the sensor insertion hole 21. The small diameter portion 34 has a smaller outer diameter than the large diameter portion 33 and is located between the large diameter portion 33 and the opening 22 of the sensor insertion hole 21. The step portion 35 connects the large diameter portion 33 and the small diameter portion 34. The clip 50 is fit into an outer surface of the small diameter portion 34 of the sensor 30. In this state, the step portion 35 of the sensor 30 interferes with the clip 50, thereby restricting the sensor 30 from slipping from the sensor insertion hole 21.

The sensor 30 includes an O-ring recess 36 at which the O-ring 40 is located between the step portion 35 and the end 31 facing the fluid passage 11. The O-ring 40 is disposed in the O-ring recess 36. Accordingly, the O-ring 40 is located between the step portion 35 of the sensor 30 and the end 31 facing the fluid passage 11. In other words, the O-ring 40 is located deeper in the sensor insertion hole 21 than the step portion 35 of the sensor 30. The O-ring 40 is a sealing member that has an annular shape and is made of material such as rubber. The O-ring 40 seals a space between an inner wall 211 of the sensor insertion hole 21 and the sensor 30 to restrict the cooling water flowing through the fluid passage 11 from leaking from the sensor insertion hole 21.

As shown in FIGS. 1 to 4, the sensor connector 20 includes the first clip insertion window 41, the second clip insertion window 42, and the cutout portions 60. In following description, the first clip insertion window 41 and the second clip insertion window 42 as a whole may be referred as clip insertion windows 41, 42

Each of the first clip insertion window 41 and the second clip insertion window 42 passes through the sensor connector 20 between an outer wall and the inner wall 211. The first clip insertion window 41 is located at a position of the sensor connector 20 in a circumferential direction of the sensor connector 20. The second clip insertion window 42 is located at a position of the sensor connector 20 in the circumferential direction. The first clip insertion window 41 is opposite to the second clip insertion window 42 relative to an axis Ax of the sensor insertion hole 21. That is, the first clip insertion window 41 faces the second clip insertion window 42 through the axis Ax of the sensor insertion hole 21.

A first supporting pillar 23 and a second supporting pillar 24 are disposed between the first clip insertion window 41 and the second clip insertion window 42 in the circumferential direction of the sensor connector 20. The first supporting pillar 23 faces the second supporting pillar 24 through the axis Ax of the sensor insertion hole 21.

The cutout portions 60 are cut out from the first clip insertion window 41 and the second clip insertion window 42 to the opening 22 in an axial direction Ax of the sensor insertion hole 21. In following description, one of the cutout portions 60 cut out from the first clip insertion window 41 to the opening 22 in the axial direction Ax of the sensor insertion hole 21 is referred as a first cutout portion 61. The other one of the cutout portions 60 cut out from the second clip insertion window 42 to the opening 22 in the axial direction Ax of the sensor insertion hole 21 is referred as a second cutout portion 62.

Because the sensor connector 20 includes the cutout portions 60, a state of an assembly of the O-ring 40 can be recognized through the cutout portions 60 from an outside of the sensor connector 20 after the sensor 30 is inserted into the sensor insertion hole 21. Accordingly, malfunctions such that the O-ring 40 is assembled with twisted or the O-ring 40 is not assembled can be reduced.

A length of the first cutout portion 61 in the circumferential direction is smaller than a length of the first clip insertion window 41 in the circumferential direction. Thus, as shown in FIG. 4, the sensor device 1 includes a first clip stopper 25 and a second clip stopper 26. The first clip stopper 25 extends, in the circumferential direction, from the first supporting pillar 23 between the opening 22 and the first clip insertion window 41 in the axial direction. The second clip stopper 26 extends, in the circumferential direction, from the second supporting pillar 24 between the opening 22 and the first clip insertion window 41 in the axial direction.

Figure 1:
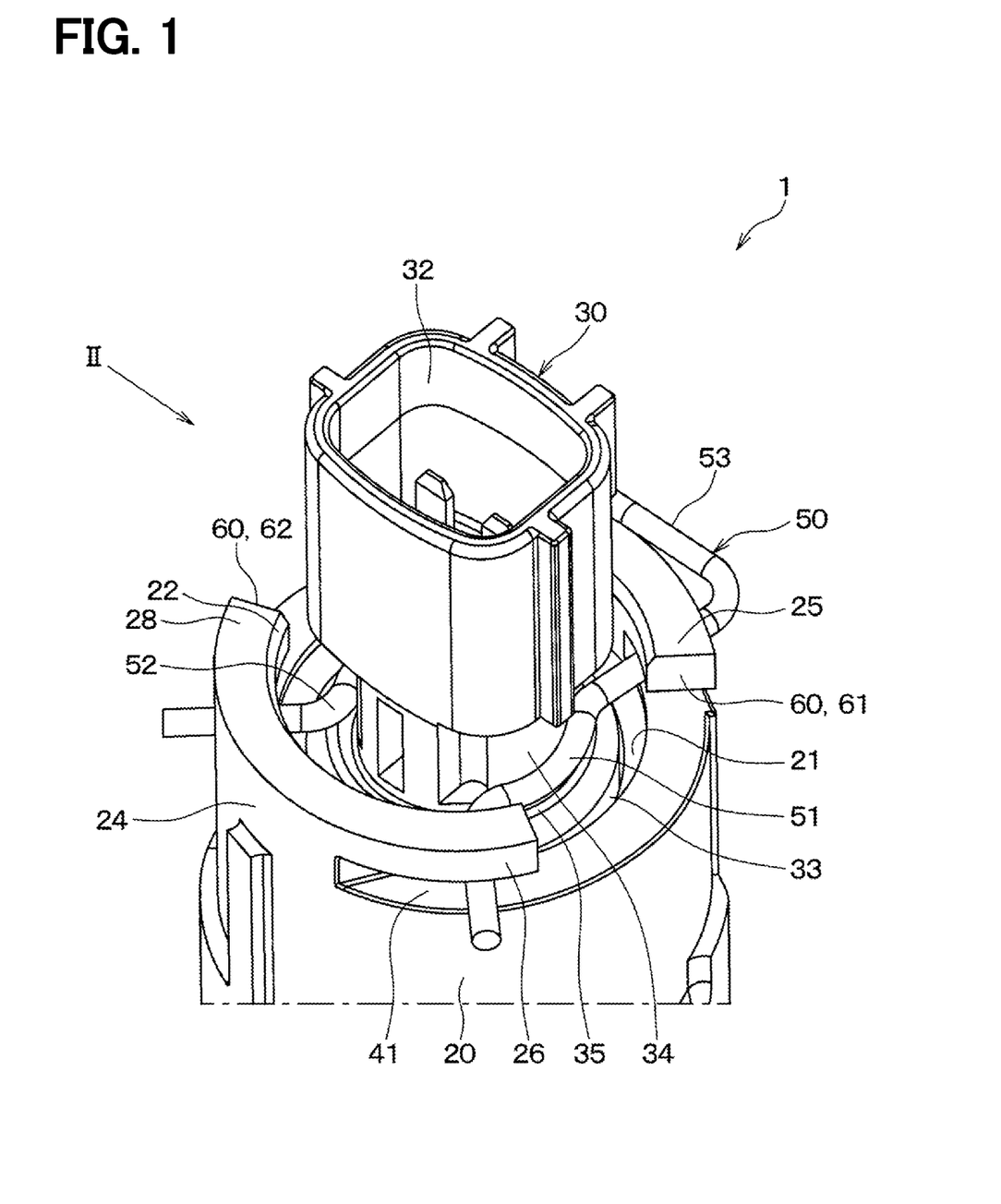
FIG. 1 is a perspective view of a sensor device in a first embodiment.
Figure 2:
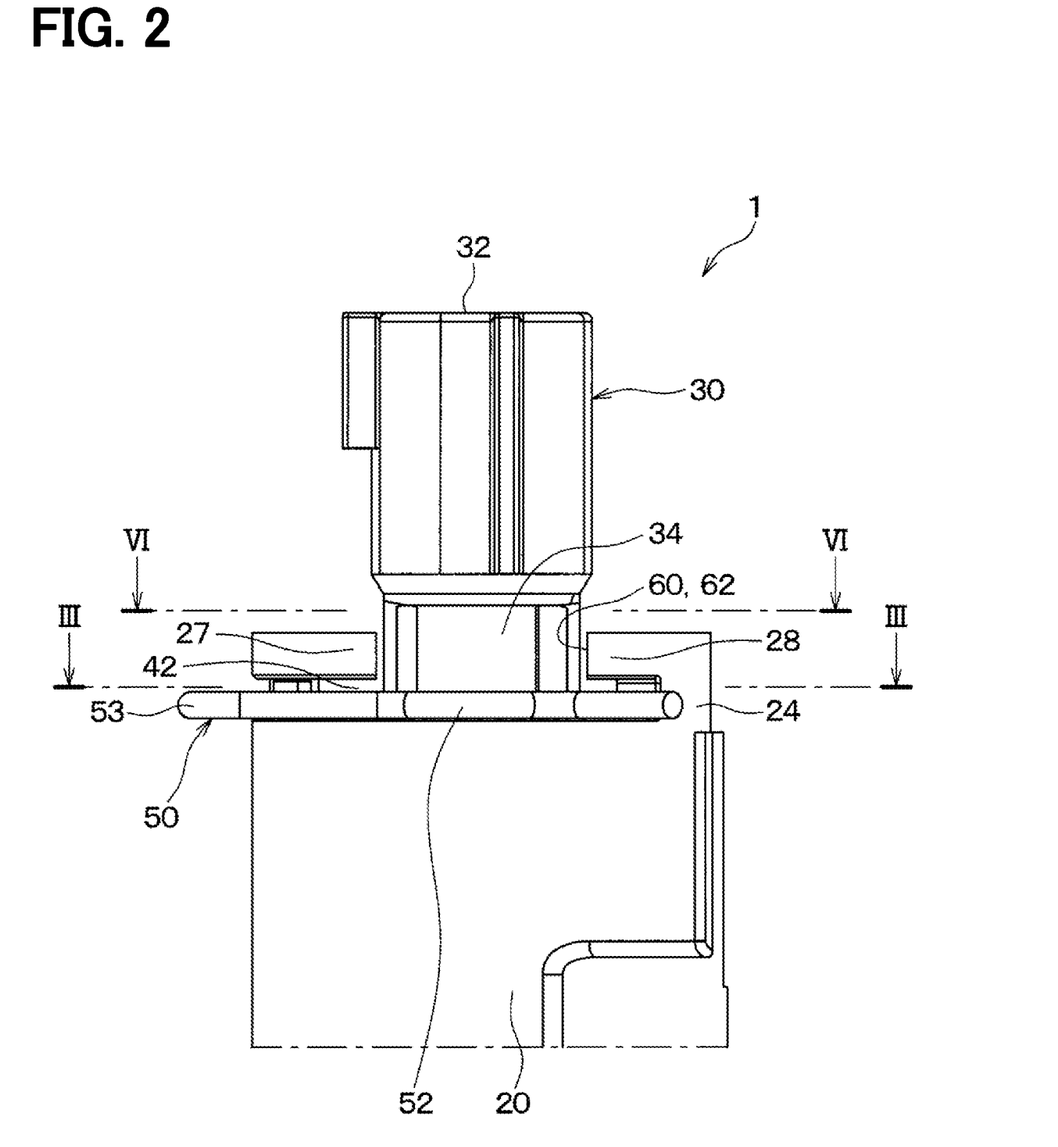
FIG. 2 is a side view of the sensor device viewed in a II direction in FIG. 1.
Figure 3:
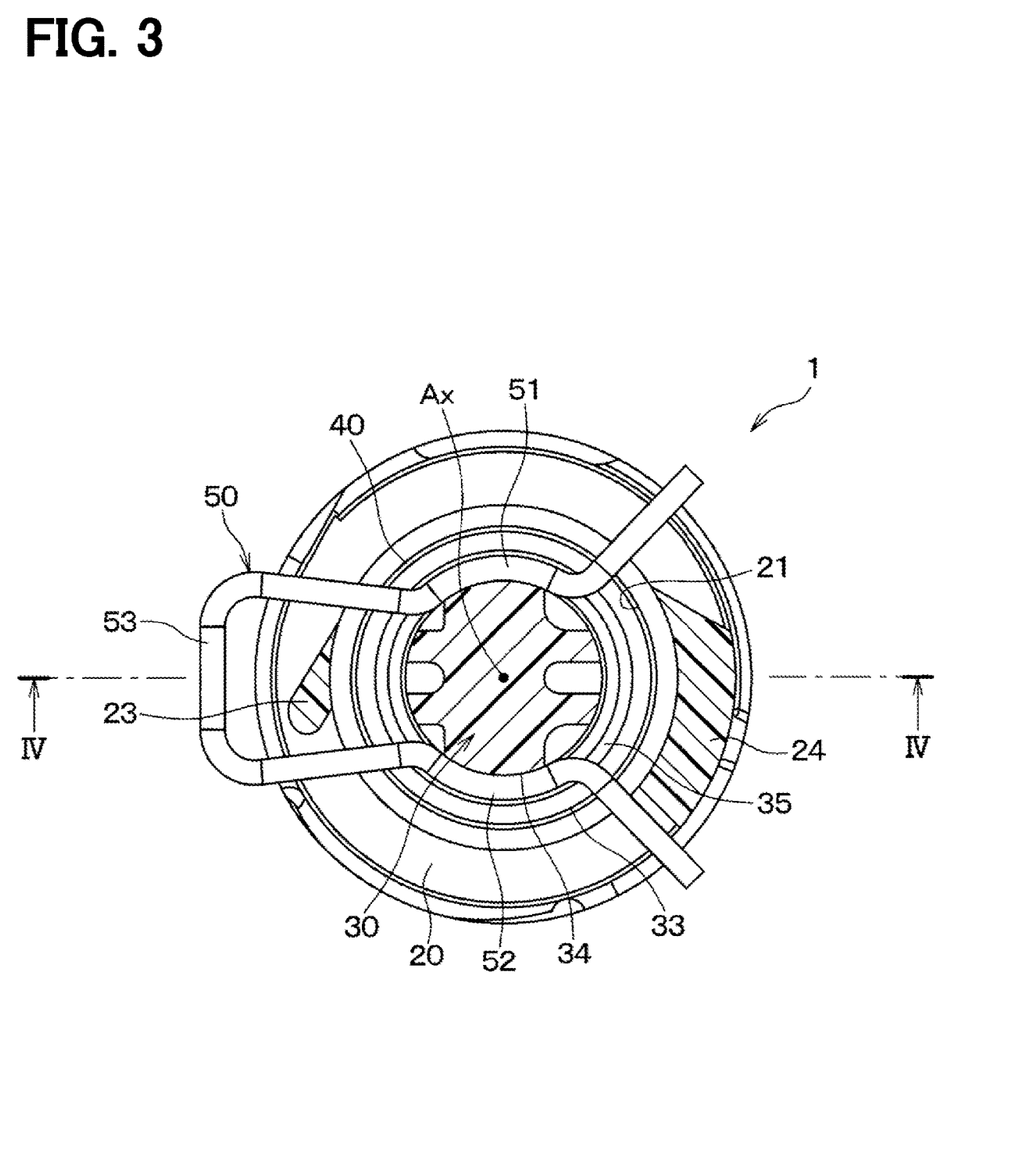
FIG. 3 is a cross-sectional view taken along a line III-III of FIG. 2.

A length of the second cutout portion 62 in the circumferential direction is smaller than a length of the second clip insertion window 42 in the circumferential direction. Thus, as shown in FIG. 2, the sensor device 1 includes a third clip stopper 27 and a fourth clip stopper 28. The third clip stopper 27 extends, in the circumferential direction, from the first supporting pillar 23 between the opening 22 and the second clip insertion window 42 in the axial direction. The forth clip stopper 28 extends, in the circumferential direction, from the second supporting pillar 24 between the opening 22 and the second clip insertion window 42.

As shown in FIGS. 1 to 4, the clip 50 is inserted into the first clip insertion window 41 and the second clip insertion window 42 and holds both sides of the small diameter portion 34 of the sensor 30, thereby fixing the sensor 30 in the sensor insertion hole 21. The clip 50 is made of metal having a predetermined elasticity. The clip 50 includes a first arm 51, a second arm 52, and a connecting portion 53. The first arm 51 is inserted into the first clip insertion window 41 and a part of the first arm 51 is in contact with the small diameter portion 34 of the sensor 30. The second arm 52 is inserted into the second clip insertion window 42 and a part of the second arm 52 is in contact with the small diameter portion 34 of the sensor 30. The connecting portion 53 connects the first arm 51 and the second arm 52 at the outside of the sensor connector 20 (specifically, at the outside of the first supporting pillar 23). The connecting portion 53 extends straight.

A portion of the first arm 51 between the part in contact with the small diameter portion 34 of the sensor 30 and an end connected to the connecting portion 53 is able to be in contact with the first clip stopper 25. A portion of the first arm 51 between a tip end (i.e., an end opposite to the connecting portion 53) and the part in contact with the small diameter portion 34 of the sensor 30 is able to be in contact with the second clip stopper 26. A portion of the second arm 52 between the part in contact with the small diameter portion 34 of the sensor 30 and an end connected to the connecting portion 53 is able to be in contact with the third clip stopper 27. A portion of the second arm 52 between the portion in contact with the small diameter portion 34 of the sensor 30 and a tip end (i.e., an end opposite to the connecting portion 53) is able to be in contact with the fourth clip stopper 28. Accordingly, the clip 50 restricts the sensor 30 from slipping from the sensor insertion hole 21 and can fix the sensor 30 in the sensor insertion hole 21.

Figure 5:
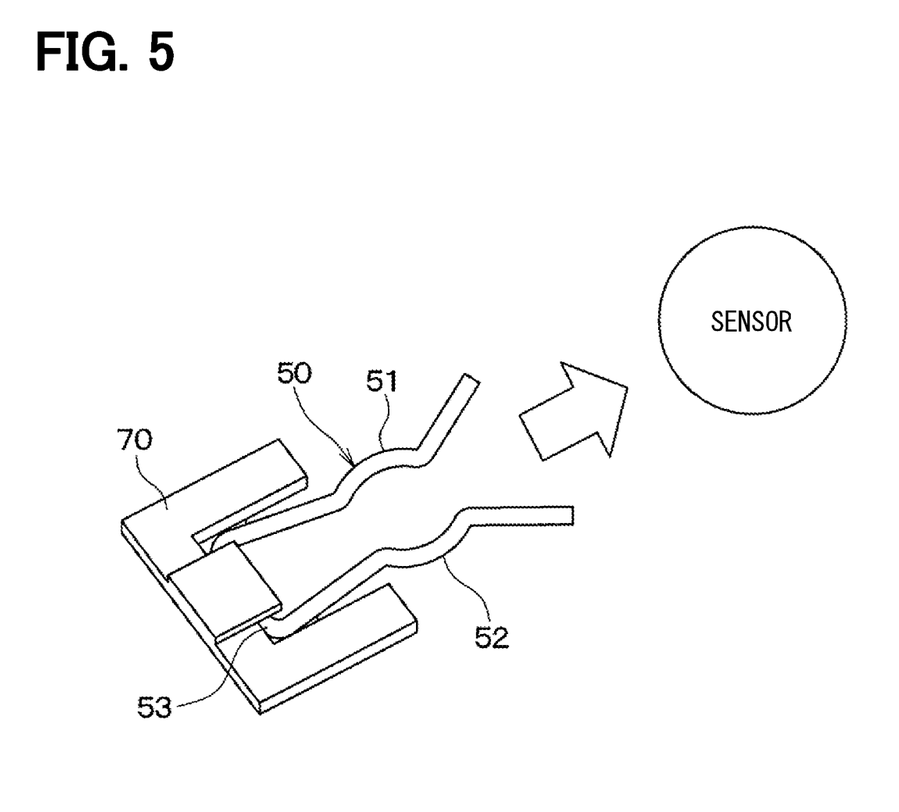
FIG. 5 is a perspective view of a clip and an assembly jig.
Figure 6:
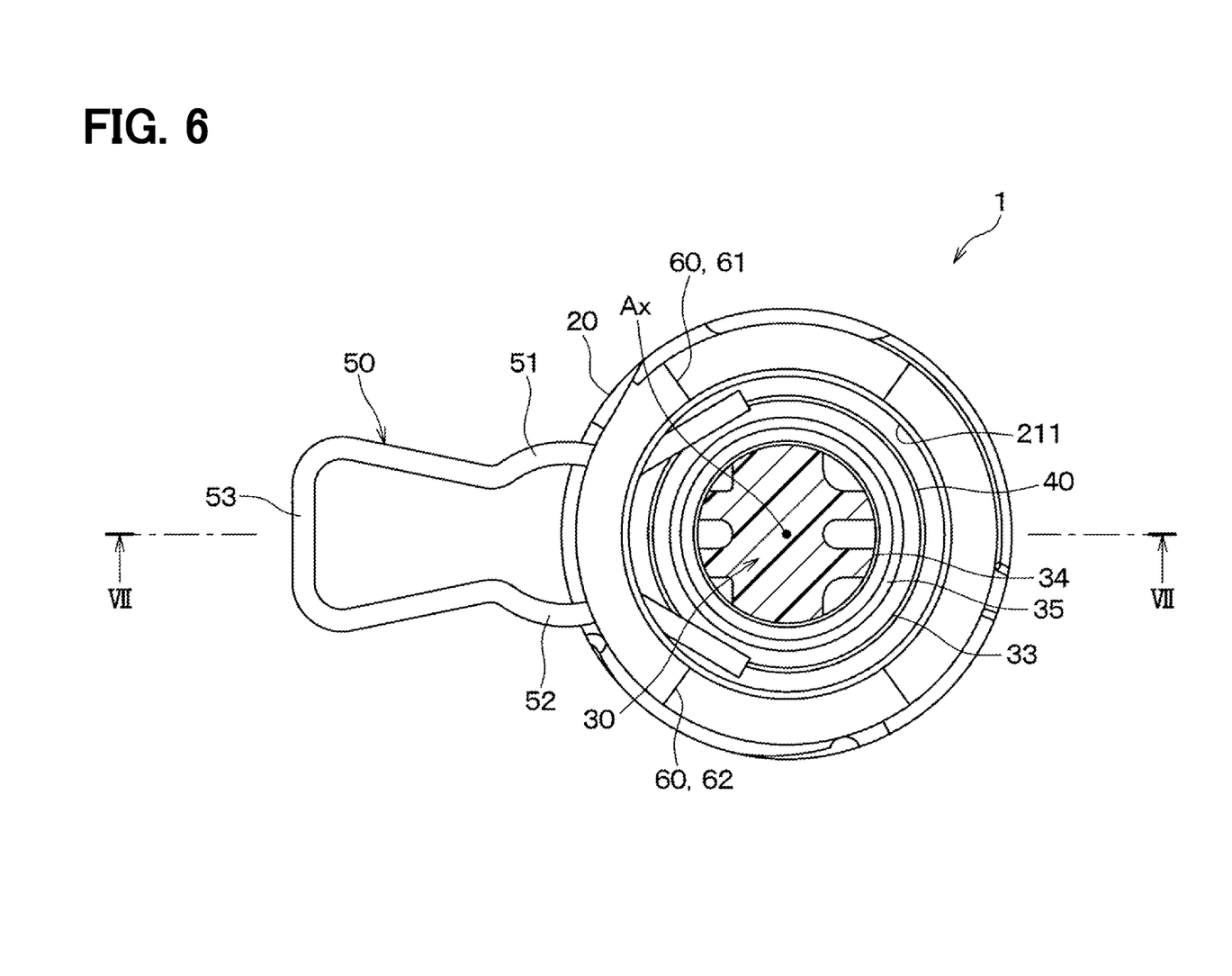
FIG. 6 is a cross-sectional view taken along a line VI-VI of FIG. 2 illustrating a state in which the clip is inserted.

As shown in FIG. 5, the clip 50 is inserted into the clip insertion windows 41 and 42 of the sensor connector 20 with supported by an assembly jig 70. A minor clearance is defined between the connecting portion 53 of the clip 50 and the assembly jig 70 to attach the clip 50 to the assembly jig 70 and detach the clip 50 from the assembly jig 70. Thus, the clip 50 may be slightly tilted to the axial direction Ax of the sensor insertion hole 21 with supported by the assembly jig 70.

Figure 13:
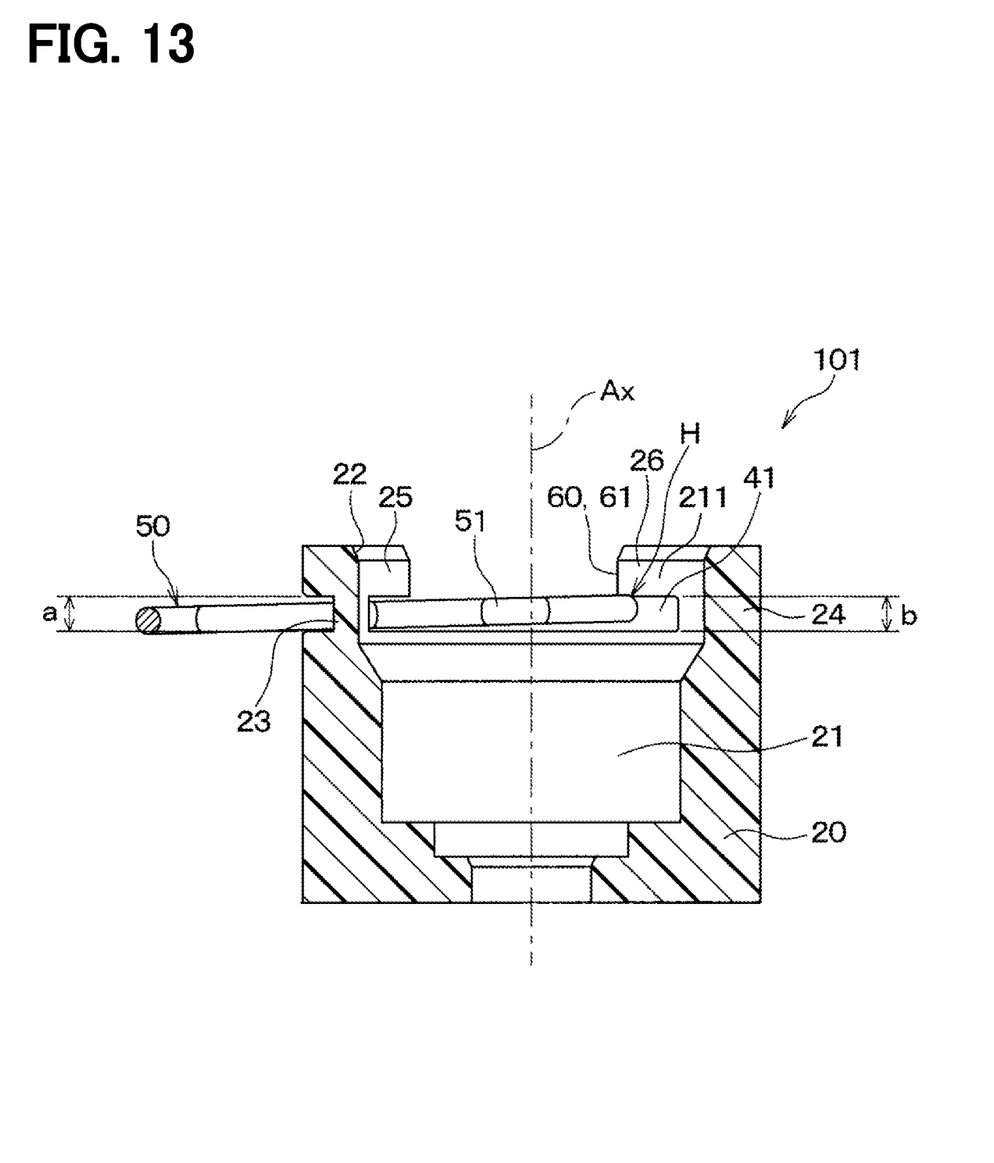
FIG. 13 is a cross-sectional view of a comparative example illustrating a state in which the clip is inserted.

FIG. 13 illustrates a state of a sensor device 101 of a first comparative example in which the clip 50 is inserted. A first width a is defined by a width, in the axial direction, at an inlet side of each of the first clip insertion windows 41 and 42 from which the clip 50 is inserted. A second width b is defined by a width, in the axial direction, at a far side of each of the first clip insertion windows 41 and 42. In the comparative example, the first width a is the same as the second width b in both of the clip insertion windows 41 and 42.

In FIG. 13, the clip 50 is supported by the assembly jig 70 and a tip end of the clip 50 is inclined in an oblique direction toward the opening 22. The tip end of the clip 50 hit the inner wall 211 of the sensor insertion hole 21. In FIG. 13, an arrow H indicates a position at which the tip end of the clip 50 hit the inner wall 211 of the sensor insertion hole 21. When the tip end of the clip 50 hit the inner wall 211 during the insertion of the clip 50, the clip 50 may not be assembled correctly. In this case, a degree of misalignment of the axis of the sensor 30 may be large, which may further cause a malfunction of the sensor 30 or decrease a reliability of the sensor device 101.

Figure 7:
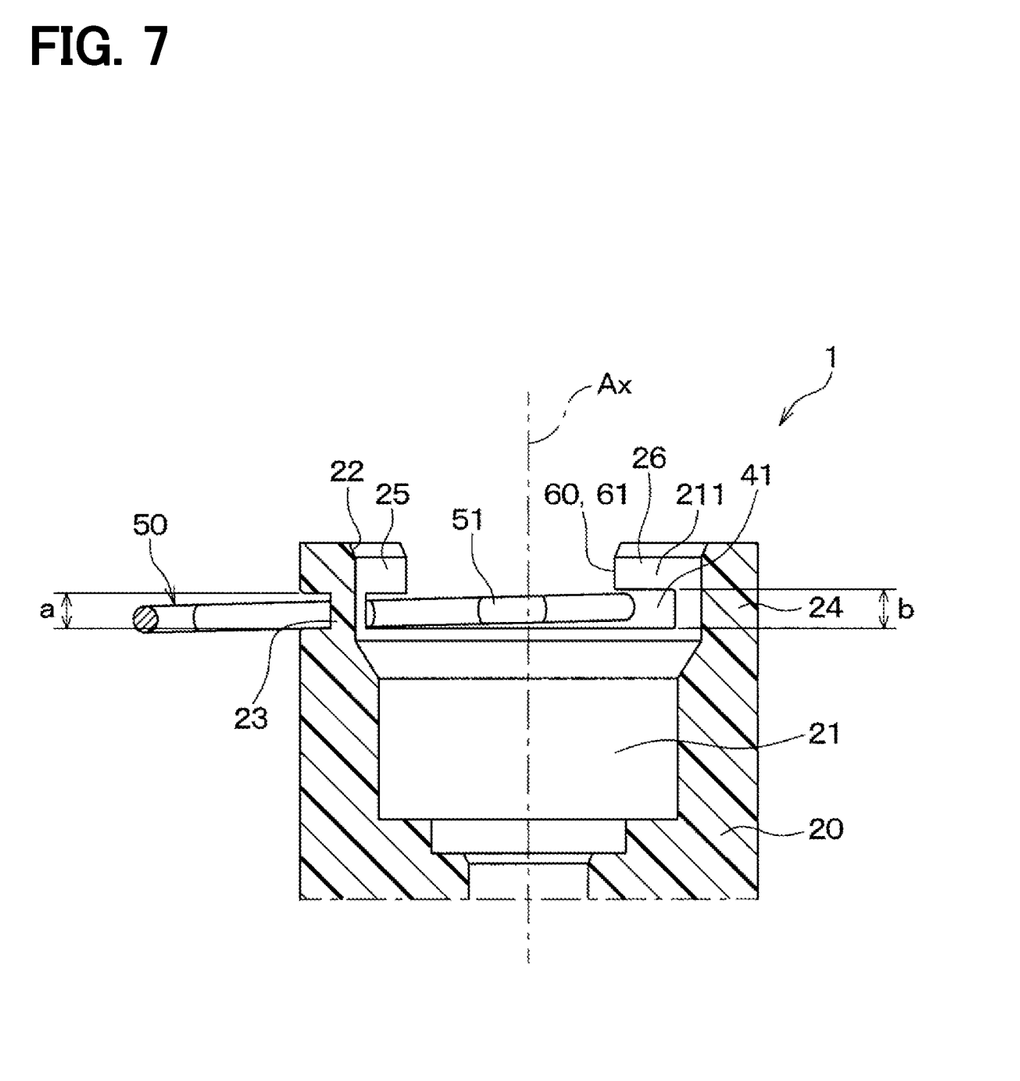
FIG. 7 is a cross-sectional view taken along a line VII-VII of FIG. 6 without the sensor illustrating a state in which the clip is inserted.

In contrast, as shown in FIG. 7, the sensor device 1 of the first embodiment have the second width b larger than the first width a. That is, the second width b of the first clip insertion window 41 defined by the second clip stopper 26 is larger than the first width a of the first clip insertion window 41 defined by the first clip stopper 25. Similarly, the second width b of the second clip insertion window 42 defined by the fourth clip stopper 28 is larger than the first width a of the second clip insertion window 42 defined by the third clip stopper 27. Accordingly, when the clip 50 is inserted into the clip insertion windows 41, 42 with supported by the assembly jig 70 and slightly tilted to the axial direction Ax, it is possible to reduce malfunctions such that the tip end of the clip 50 hit the inner wall 211 of the sensor insertion hole 21. Therefore, the clip 50 can be assembled accurately. As a result, the sensor device 1 can reduce malfunctions in assembling the clip 50 and improve the reliability.

Regarding the clip insertion windows 41 and 42, the second width b at the far side is equal to or greater than 1.1 times the first width a at the inlet side from which the clip 50 is inserted. The second width b is equal to or less than 1.5 times the first width a. That is, when a ratio of the second width b at the far side to the first width a at the inlet side is described as b/a, the ratio satisfies a relationship "$1.1 \leq b/a \leq 1.5$".

When the second width b at the far side is equal to or greater than 1.1 times the first width a at the inlet side, it is possible to reduce a malfunction such that the tip end of the clip 50 hit the inner wall 211 of the sensor insertion hole 21 during the insertion of the clip 50. When the second width b at the far side is equal to or less than 1.5 times the first width a at the inlet side, a degree of misalignment of the axis of the sensor 30 can be limited without being too large.

In the first embodiment, the second width b at the far side is widened toward the opening 22 of the sensor insertion hole 21 relative to the first width a at the inlet side. That is, the second clip stopper 26 and the fourth clip stopper 28 has a smaller width in the axial direction respectively than the first clip stopper 25 and the third clip stopper 27. In this case, the clip 50 can be inserted into the clip insertion windows 41 and 42 even when the clip 50 is supported by the assembly jig 70 and the tip end of the clip 50 is slightly tilted upward in the oblique direction (i.e., toward the opening 22).

A reason why the second width b at the far side is formed larger than the first width a at the inlet side without widening both of the first width a from which the clip 50 is inserted and the second width b will be described.

Figure 8:
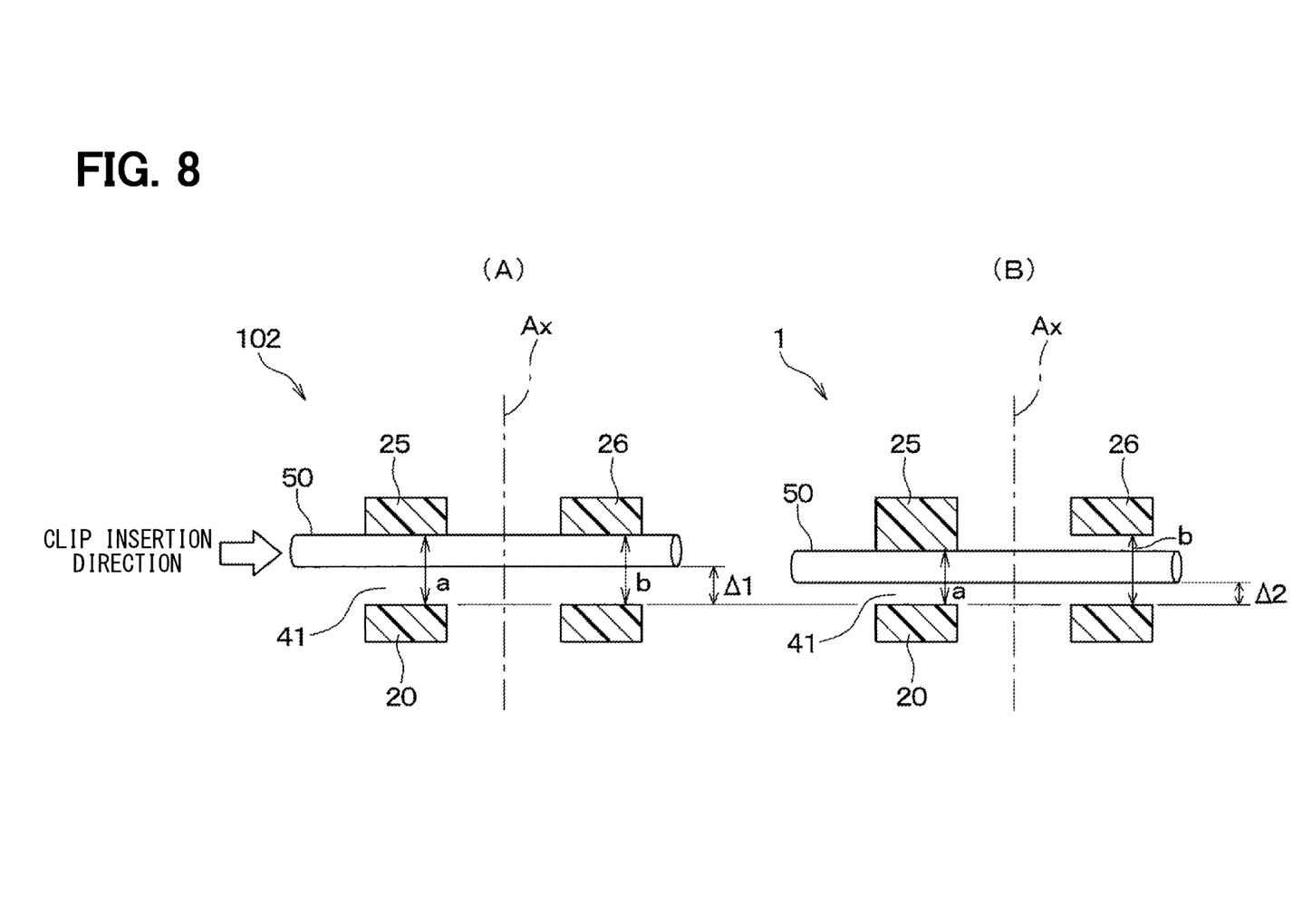
FIG. 8 is a schematic view illustrating a relationship between a width of a clip insertion window and a degree of misalignment of an axis of the sensor.

FIG. 8 (A) is a schematic view of the clip insertion windows 41 and 42 of a sensor device 102 of a second comparative example. In the second comparative example, in regard to the width of the clip insertion windows 41 and 42 in the axial direction Ax of the sensor insertion hole 21, the first width a at the inlet side from which the clip 50 is inserted is formed larger as with the second width b at the far side. When the sensor 30 is fixed with the clip 50 in the second comparative example, the degree of the misalignment of the axis of the sensor 30 can be large as shown in an arrow Δ1.

In contrast, FIG. 8 (B) is a schematic view of the clip insertion windows 41 and 42 of the sensor device 1 in the first embodiment. In the first embodiment, as described above, the second width b at the far side is larger than the first width a at the inlet side from which the clip 50 is inserted. In this case, the degree of the misalignment of the axis of the sensor 30 is defined by the first width a at the inlet side. Accordingly, according to the sensor device 1 in the first embodiment, the degree of the misalignment of the axis of the sensor 30, as shown in an arrow Δ2, is less than that in the sensor device 102 of the second comparative example. Thus, the sensor device 1 in the first embodiment can reduce malfunctions of the sensor 30 and improve the reliability.

The sensor device 1 in the first embodiment described above has the following advantages.

(1) In the first embodiment, the sensor connector 20 includes the first cutout portion 61 and the second cutout portion 62. Thus, the condition in the assembly of the O-ring 40 can be recognized from the outside of the sensor connector 20 through the first cutout portion 61 and the second cutout portion 62. As a result, malfunctions such that the O-ring 40 is assembled with twisted or that the O-ring 40 is not assembled can be reduced. Therefore, the sensor device 1 can restrict the fluid from leaking from the sensor connector 20 and improve reliability.

In the first embodiment, the clip 50 can be recognized from the outside of the sensor connector 20 through the first cutout portion 61 and the second cutout portion 62 while the clip 50 is inserted into the clip insertion windows 41 and 42 to be assembled. As a result, malfunction such that the tip end of the clip 50 hits the inner wall 211 of the sensor insertion hole 21 can be reduced and the clip 50 can be attached correctly. Thus, the sensor device 1 can reduce the malfunctions in assembly of the clip 50 and improve reliability.

In the first embodiment, the sensor connector 20 includes the cutout portions 60, thereby reducing an amount of resin. As a result, the sensor device 1 can save a weight and a cost at manufacturing.

(2) In the first embodiment, in regard to the widths of the first clip insertion window 41 and the second clip insertion window 42 in the axial direction Ax of the sensor insertion hole 21, the second width b at the far side is larger than the first width a at the inlet side from which the clip 50 is inserted.

Accordingly, when the clip 50 is inserted into the clip insertion windows 41 and 42 with supported by the assembly jig 70 and with slightly tilted to the axial direction Ax of the sensor insertion hole 21, malfunctions such that the tip end of the clip 50 hits the inner wall 211 of the sensor insertion hole 21 can be reduced. As a result, the clip 50 can be attached correctly. Thus, the sensor device 1 can reduce the malfunctions in the assembly of the clip 50 and improve the reliability.

In the first embodiment, not both of the first width a at the inlet side from which the chip 50 is inserted and the second width b at the far side are widened. Only the second width b at the far side is widened. Therefore, the displacement amount of the sensor 30 in the axial direction Ax after being fixed with the clip 50 can be reduced. Thus, the sensor device 1 reduces the malfunctions and is improved in reliability.

(3) In the first embodiment, the connecting portion 53 of the clip 50 extends straight. Thus, when the clip 50 is inserted into the clip insertion windows 41 and 42 while the connecting portion 53 of the clip 50 is supported by the assembly jig 70, the clip 50 is restricted from being tilted toward the first arm 51 or the second arm 52 relative to the assembly jig 70. Thus, the clip 50 can be attached correctly.

As a result, the sensor device 1 can reduce malfunctions in the assembly of the clip 50 and improve the reliability.

Second Embodiment

A second embodiment will be described. In a description of the second embodiment, a sensor device 1 is disposed at a valve device.

Figure 9:
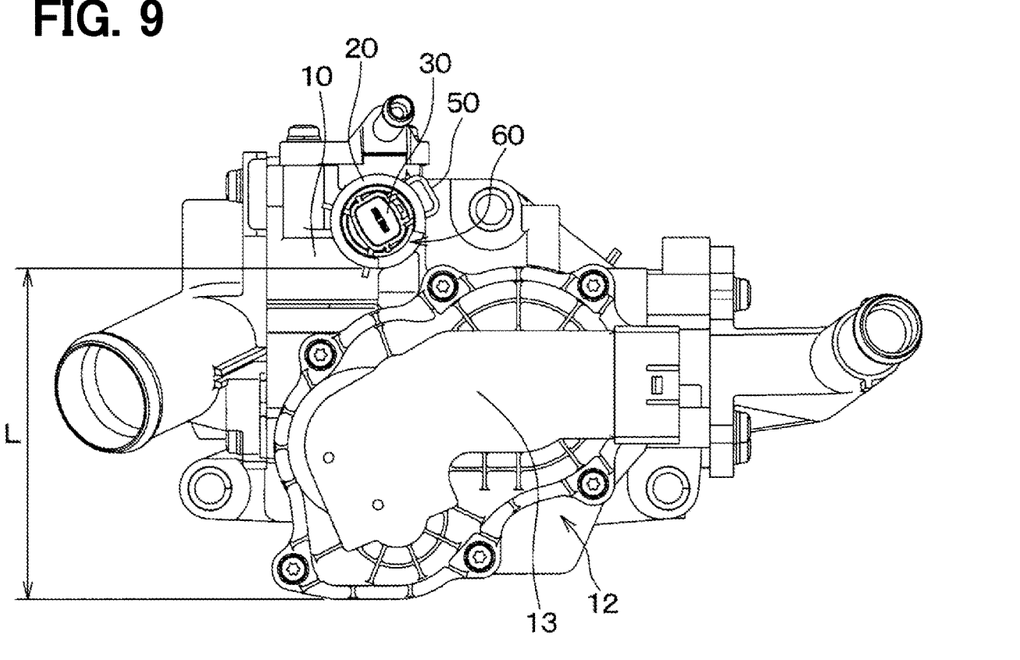
FIG. 9 is a plane view of a valve device to which a sensor device in a second embodiment is mounted.
Figure 10:
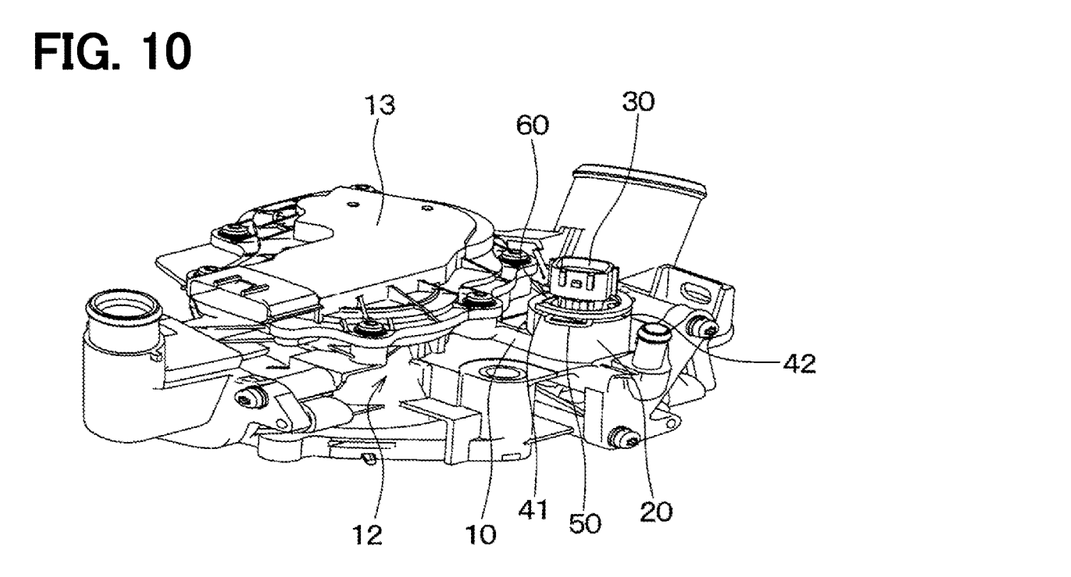
FIG. 10 is a perspective view of the valve device to which the sensor device in the second embodiment is mounted.

As shown in FIGS. 9 and 10, the valve device includes a housing body 12, a pipe 10, a sensor connector 20, a sensor 30, a first clip insertion window 41, a second clip insertion window 42, a clip 50, a cutout portion 60, and so on. FIGS. 9 and 10 illustrate a part of the valve device.

The housing body 12 houses a valve body and a driving mechanism (not shown) therein. The housing body 12 and the pipe 10 are integrally formed with each other. The pipe 10 and the sensor connector 20 are disposed at an outer side of the housing body 12. The sensor connector 20 defines a sensor insertion hole 21 and the sensor 30 is inserted into the sensor insertion hole 21.

In the second embodiment, the sensor connector 20 includes one cutout portion 60. The one cutout portion 60 of the sensor connector 20 faces the housing body 12 and the sensor connector 20 does not include a cutout portion facing away from the housing body 12. However, a distance L between an outer end portion of the housing body 12 facing away from the sensor connector 20 and the cutout portion 60 can be secured. Therefore, an outer force is restricted from being applied to the sensor 30 through the cutout portion 60 from a side of the housing body 12 facing away from the sensor connector 20.

In the second embodiment, the housing body 12 includes a protrusion 13 arranged adjacent to the sensor connector 20 at a center of the housing body 12. The protrusion 13 may be a cover member housing the driving mechanism such as a motor and a gear. The sensor connector 20 is disposed such that the one cutout portion 60 faces the protrusion 13, so that the external force is restricted from being applied to the sensor 30 through the one cutout portion 60 from a side of the sensor 30 facing the protrusion 13.

The second embodiment has similar advantages as the first embodiment.

Third Embodiment

A third embodiment will be described. The third embodiment differs from the first embodiment at a point that the sensor connector 20 does not include the cutout portions 60 and other configurations are similar to the first embodiment. Thus, different portions from the first embodiment will be mainly described.

Figure 11:
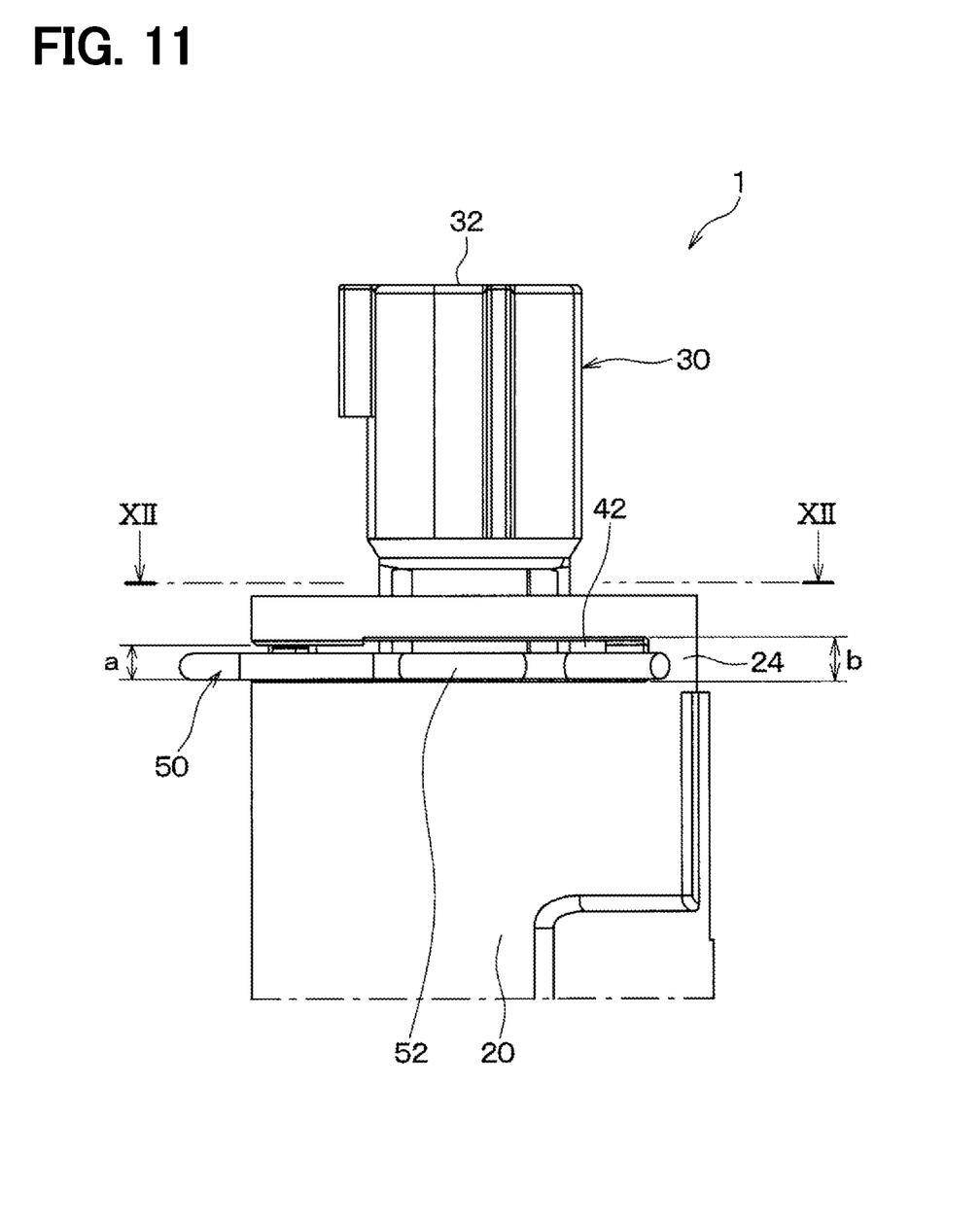
FIG. 11 is a side view of a sensor device in a third embodiment.
Figure 12:
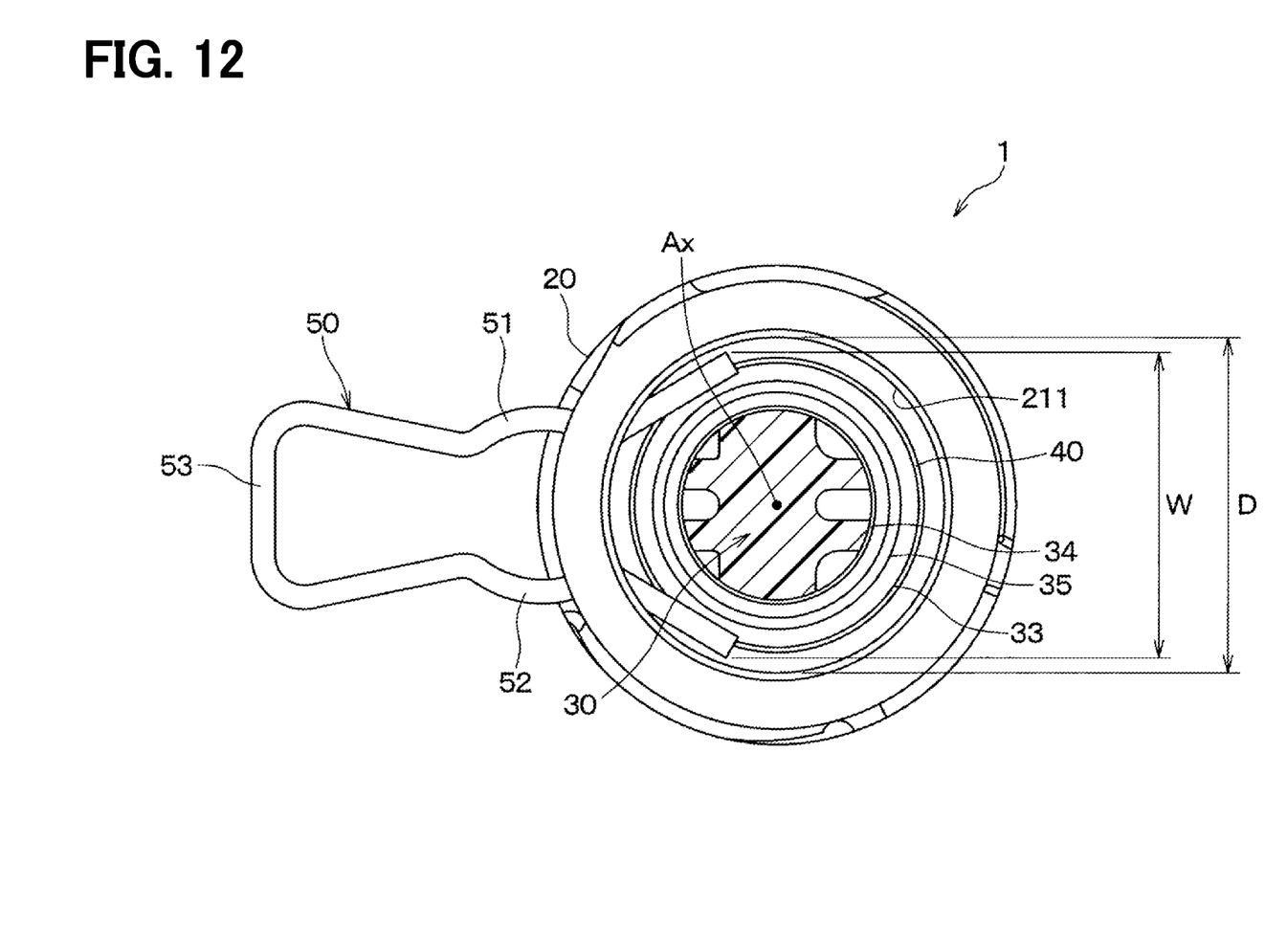
FIG. 12 is a cross-sectional view taken along a line XII-XII of FIG. 11 illustrating a state in which the clip is inserted.

As shown in FIGS. 11 and 12, according to a sensor device 1 in the third embodiment, the sensor connector 20 does not include a cutout portion 60. As shown in FIG. 12, a width W between the ends of the clip 50 is smaller than an inner diameter D of the sensor insertion hole 21. When the clip 50 is inserted into the clip insertion windows 41 and 42 of the sensor connector 20, the ends of the clip 50 may hit the inner wall 211 of the sensor insertion hole 21. In the sensor device 1 in the third embodiment, the second width b, in the axial direction Ax of the sensor insertion hole 21, at the far side of the clip insertion windows 41 and 42 is larger than the first width a, in the axial direction Ax, at the inlet side of the clip insertion windows 41 and 42. Thus, even when the clip 50 is inserted with supported by the assembly jig 70 and with slightly tilted to the axis Ax of the sensor insertion hole 21, the malfunction such that the ends of the clip 50 hit the inner wall 211 of the sensor insertion hole 21 can be reduced. As a result, the clip 50 can be attached correctly. Accordingly, the sensor device 1 in the third embodiment can reduce malfunctions at the assembly of the clip 50 and improve the reliability as with the first embodiment.

Other Embodiment

The present disclosure is not limited to above-mentioned embodiments and can be modified appropriately in a range described in claims. The above mentioned embodiments are related each other and can be combined with each other unless the combinations are impossible. In the above embodiments, elements of the embodiments are not always necessary unless the elements are described to be necessary or necessary in principle. In addition, in case that numeral values such as the number, value, amount, range of the element are mentioned, the elements are not limited to the numeral values unless the elements are described to be limited to the numeral values or apparently limited to the numeral values in principle. In case that shapes and positional relationships are mentioned in the above embodiments, the elements are not limited to the shapes and positional relationships unless the embodiments are described to be limited to the specified shapes and positional relationships or limited to the specified shapes and positional relationship in principle.

(1) The fluid flowing through the pipe 10 is a cooling water in the above embodiments, but the fluid is not limited to this. Fluid flowing through the pipe 20 may be various kinds of refrigerant or gas.

(2) In the above embodiments, the sensor 30 detects the temperature as a physical quantity of the fluid, but the sensor 30 is not limited to this. The sensor 30 may detect a pressure or a flow rate as a physical quantity of the fluid.

(3) In the above embodiments, the O-ring 40 whose cross section has a substantially circle shape is described as the sealing member having an annular shape, but the sealing member is not limited to this. The shape of the cross section of the sealing member may be a substantially square, V-shape, or X shape.

(4) In the above embodiments, the clip 50 is described to be made of metal and to have a cross section having a circle shape, but the clip 50 is not limited to this. The cross section of the clip 50 may be square and the material of the clip 50 may be resin.

(5) In the above embodiments, in regard to the width of the clip insertion windows 41 and 42 in the axial direction Ax of the sensor insertion hole 21, the second width b at the far side is widened toward the opening 22 of the sensor insertion hole 21 compared to the first width a at the inlet side. However, the width of the clip insertion windows 41 and 42 are not limited to this. The second width b at the far side may be widened away from the opening 22 toward the deep position of the sensor insertion hole 21 compared to the first width a at the inlet side. In this case, the clip 50 can be inserted into the clip insertion windows 41 and 42 while the clip 50 is supported by the assembly jig 70 and the tip end of the clip 50 is slightly tilted downward in an oblique direction (i.e., toward the deep position).

What is claimed is:

1. A sensor device configured to detect a physical quantity of a fluid, the sensor device comprising:
    a pipe defining a fluid passage through which the fluid flows;
    a sensor connector defining a sensor insertion hole fluidly in communication with the fluid passage;
    a sensor configured to detect the physical quantity of the fluid flowing through the fluid passage, the sensor including:
        a large diameter portion to be located at a deep position of the sensor insertion hole;
        a small diameter portion to be located between the large diameter portion and an opening of the sensor insertion hole; and
        a step portion connecting the large diameter portion and the small diameter portion;
    a sealing member located at a side of the step portion of the sensor deeper in the sensor insertion hole and configured to seal a space between an inner wall of the sensor insertion hole and the sensor, the sealing member having an annular shape;
    a first clip insertion window that is located at a part of the sensor connector in a circumferential direction and passes through the sensor connector between an outer wall and the inner wall;
    a second clip insertion window that is located at a part of the sensor connector in the circumferential direction and passes through the sensor connector between the outer wall and the inner wall, the second clip insertion window being located opposite to the first clip insertion window relative to an axis of the sensor insertion hole;
    a clip that is inserted into the first clip insertion window and the second clip insertion window to fix the sensor in the sensor insertion hole by holding both sides of the small diameter portion of the sensor; and
    at least one cutout portion that is cut out from cither the first clip insertion window or the second clip insertion window to the opening in an axial diction of the sensor insertion hole; wherein
    a second width, in the axial direction, of a far side of the first clip insertion window is larger than a first width, in the axial direction, of an inlet side of the first clip insertion window from which the clip is inserted, and
    a second width, in the axial direction, of a far side of the second clip insertion window is larger than a first width, in the axial direction, of an inlet side of the second clip insertion window from which the clip is inserted.

2. The sensor device according to claim 1, wherein the clip includes:
    a first arm to be inserted into the first clip insertion window and be in contact with the small diameter portion of the sensor;
    a second arm to be inserted into the second clip insertion window and be in contact with the small diameter portion;
    a connecting portion that connects the first arm and the second arm and is to be located at an outer side of the sensor connector, and
    the connecting portion extends straight.

3. A sensor device configured to detect a physical quantity of a fluid, the sensor device comprising:
    a pipe defining a fluid passage through which the fluid flows;
    a sensor connector defining a sensor insertion hole fluidly in communication with the fluid passage;
    a sensor configured to detect the physical quantity of the fluid flowing through the fluid passage, the sensor including:
        a large diameter portion to be located at a deep position of the sensor insertion hole;

a small diameter portion to be located between the large diameter portion and an opening of the sensor insertion hole; and
a step portion connecting the large diameter portion and the small diameter portion;
a scaling member located at a side of the step portion of the sensor deeper in the sensor insertion hole and configured to seal a space between an inner wall of the sensor insertion hole and the sensor, the sealing member having an annular shape;
a first clip insertion window that is located at a pan of the sensor connector in a circumferential direction and passes through the sensor connector between an outer wall and the inner wall;
a second clip insertion window that is located at a part of the sensor connector in the circumferential direction and passes through the sensor connector between the outer wall and the inner wall, the second clip insertion window being located opposite to the first clip insertion window relative to an axis of the sensor insertion hole;
a clip that is inserted into the first clip insertion window and the second clip insertion window to fix the sensor in the sensor insertion hole by holding both sides of the small diameter portion of the sensor; and
at least one cutout portion that is cut out from either the first clip insertion window or the second clip insertion window to the opening in an axial direction of the sensor insertion hole;
a housing body integrally formed with the pipe, wherein
the at least one cutout portion of the sensor connector faces the housing body, and
the sensor connector does not have the at least one cut out portion facing away from the housing body.

4. The sensor device according to claim 3, wherein the housing body includes a protrusion arranged adjacent to the sensor connector.

5. A sensor device configured to detect a physical quantity of a fluid, the sensor device comprising:
a pipe defining a fluid passage through which the fluid flows;
a sensor connector defining a sensor insertion hole fluidly in communication with the fluid passage;
a sensor configured to detect the physical quantity of the fluid flowing through the fluid passage, the sensor including:
a large diameter portion to be located at a deep position of the sensor insertion hole;
a small diameter portion to be located between the large diameter portion and an opening of the sensor insertion hole; and
a step portion connecting the large diameter portion and the small diameter portion;
a sealing member that is located at a side of the step portion deeper in the sensor insertion hole and configured to seal a space between an inner wall of the sensor insertion hole and the sensor, the sealing member having an annular shape;
a first clip insertion window that is located at a part of the sensor connector in a circumferential direction and passes through the sensor connector between an outer wall and the inner wall;
a second clip insertion window that is located at a part of the sensor connector in the circumferential direction and passes through the sensor connector between the outer wall and the inner wall, the second clip insertion window being located opposite to the first clip insertion window relative to an axis of the sensor insertion hole;
a clip configured to be inserted into the first clip insertion window and the second clip insertion window to fix the sensor in the sensor insertion hole by holding both sides of the small diameter portion of the sensor, wherein
a second width, in the axial direction, located at a far side of the first clip insertion window is larger than a first width, in the axial direction, located at an inlet side of the first clip insertion window from which the clip is inserted, and
a second width, in the axial direction, located at a far side of the second clip insertion window is larger than a first width, in the axial direction, located at an inlet side of the second clip insertion window from which the clip is inserted.

* * * * *